Figure 1:
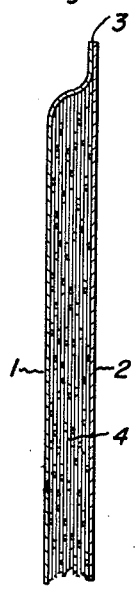

April 20, 1965  H. M. STRONG ETAL  3,179,549
THERMAL INSULATING PANEL AND METHOD OF MAKING THE SAME
Filed June 10, 1964  3 Sheets-Sheet 1

Inventors:
Herbert M. Strong;
Francis P. Bundy,
by
Their Attorney.

April 20, 1965  H. M. STRONG ETAL  3,179,549
THERMAL INSULATING PANEL AND METHOD OF MAKING THE SAME
Filed June 10, 1964  3 Sheets-Sheet 2

Inventors
Herbert M. Strong;
Francis P. Bundy,
by
Their Attorney.

3,179,549
THERMAL INSULATING PANEL AND METHOD OF MAKING THE SAME
Herbert M. Strong, Schenectady, and Francis P. Bundy, Scotia, N.Y., assignors to General Electric Company, a corporation of New York
Filed June 10, 1964, Ser. No. 373,907
5 Claims. (Cl. 161—43)

This invention relates to thermal insulating structures and more particularly to thermal insulating structures of the vacuum type, in which the walls defining the evacuated space are supported in spaced relationship by a filler material.

This application is a continuation-in-part of application S.N. 750,549, filed July 17, 1958, now abandoned, which application is a continuation-in-part of our applications, Serial No. 236,788, filed July 14, 1951, now abandoned, and Serial No. 629,381, filed December 19, 1956, all of which applications are assigned to the same assignee as the instant application.

It has previously been known that evacuated spaces afford effective thermal insulation. However, practical thermal insulation utilizing a vacuum has been limited largely to cylindrical glass containers or flasks, such as those of the Dewar type, the curved wall structures of which have sufficient strength to support them against atmospheric pressure. Containers of this type have a further limitation in that the pressure must be maintained at a very low level, such as 1 micron of mercury or less, to provide effective thermal insulation.

In keeping with basic premise that effective thermal insulation can be secured by minimizing heat transmission by gas conduction attempts were made to produce vacuum panel-type thermal insulating structures in which flat walls defining the vacuum space are employed. However, because of the outer atmospheric pressure tending to deform such structures, it became necessary to supply internal support means to maintain the walls in the desired spaced relationship. However, as seen as internal support means were introduced between the flat walls of the panel, the problem of reducing heat transmission became infinitely more complex. Not only did the internal support means have to be able to withstand the load of at least one atmosphere (more than 1 ton/sq. ft.) without increasing the transfer of heat by solid conduction, but in addition, radiation became a problem in connection with the panel construction. It was soon determined that the gas conduction and radiation heat transmission could be readily controlled by using as the internal support means which defined very many extremely small voids. However, the great decrease in the heat transmission by gas conduction and radiation afforded by these materials was in each instance substantially offset by the great increase which occurred in the loss of heat by solid conduction. A multitude of materials and mechanisms were proposed. One such means was the use of a relatively large number of spacers. However, such spacers conduct heat by solid conduction so readily between the walls that they reduce to a substantial extent the benefits of the vacuum as an insulating medium. This great detraction from the desired insulating effect occurs even when the spacers are made of materials of relatively low heat conductivity. Another mechanism found unsuccessful, was to support the walls of such an evacuated panel with finely divided material or powder, which was poured or otherwise introduced into the space between the walls. It has also been proposed to substitute for the powdered or granulated materials ordinary glass wool wherein the fibers are disposed substantially entirely at random in all directions. This powder when compressed resists the force of the atmospheric pressure and supports the walls, however, in each instance, with either the powder or the wool, when the panel is compressed under the external force of the atmosphere, a substantial amount of solid conduction of heat unavoidably occurs and seriously reduces the insulating effect of the evacuated space.

In the case of the powder this occurs because of direct solid conduction of heat from particle to particle and in the case of the wool the reduction in insulating efficiency occurs because of the multitude of direct heat conducting paths provided by short-circuiting fibers, which are disposed in the general direction of heat flow. In addition, such powders and wools usually contain large quantities of gas, which are difficult to remove from these materials and this gas tends to gradually release from the particles to the spaces therebetween, destroying the desired degree of vacuum.

Our work has produced a highly efficient insulating panel construction, which successfully disposes at one and the same time of the problems of gas conduction heat transmission, of radiation heat transmission, of solid heat transmission and of support for the panel walls.

It is an object of this invention to provide an improved thermal insulating structural unit of the vacuum type.

It is another object of this invention to provide a thermal insulating structure of the vacuum type having spaced walls enclosing therebetween filler material for supporting walls in their spaced relationship with reduced heat conductivity therebetween.

It is another object of this invention to provide an improved thermal insulating structure of the vacuum type which provides a highly effective thermal insulation when evacuated to pressure within a relatively wide range of pressures.

It is still another object of this invention to provide an improved thermal insulating structure of the vacuum type containing an oriented filler material which is rendered effective by its orientation to reduce radiation between the spaced walls.

It is still a further object of this invention to provide an improved thermal insulating structure which makes possible the construction of articles such as modular units for building construction, cargo vessels, refrigerator cabinets, ranges, cooking vessels, etc. with walls only a fraction of the thickness required with the use of conventional insulated construction approaching comparable efficiency, thereby substantially increasing the available storage space, cooking space, etc.

Further objects and advantages of this invention will become apparent as the following description proceeds, and the features of novelty which characterize this invention will be pointed out with particularity in the claims annexed to and forming part of this specification.

In carrying out the objects of this invention, a panel or other structure including spaced walls is employed. The space between the walls is filled at least in part with a filler material comprising filaments of glass or materials of similar characteristics, and these filaments are oriented as perfectly as practicable in a plurality of substantially parallel planes being disposed at random in the parallel planes, the disposition of the planes being transverse or normal to the direction of heat flow between the walls, that is, extending in the general direction of the walls themselves. The space between the walls is evacuated and the filler material supports the walls in the desired spaced relationship against the inwardly-acting force of the external atmospheric pressure, the filler material being greatly compacted and reduced in thickness relative to conventional insulating structures not employing a vacuum. The surfaces of the fibers are free of any foreign material which, if present, would tend to increase the thermal conductivity between the fibers, and which would tend to give off gases after assembly.

Figure 2:
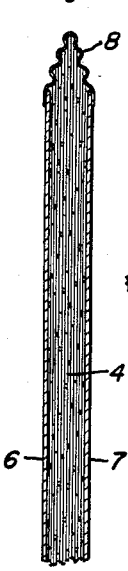
Figure 5:
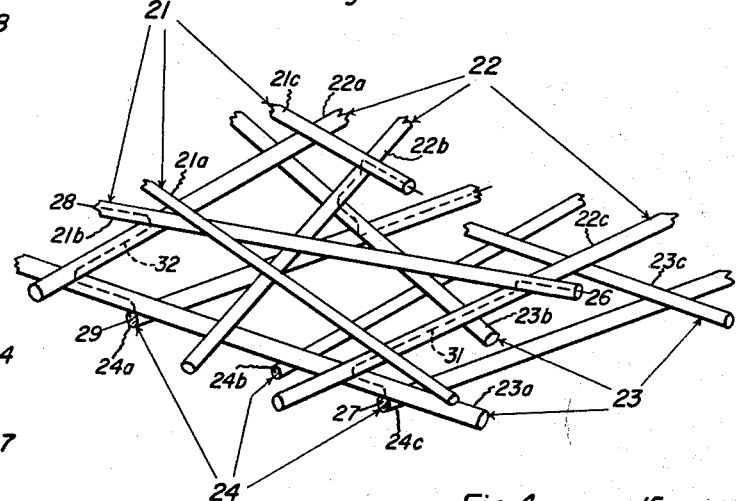
Figure 3:
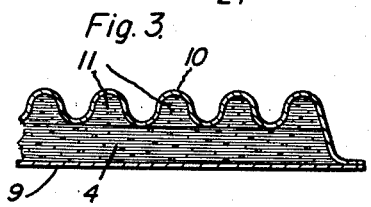
Figure 4:
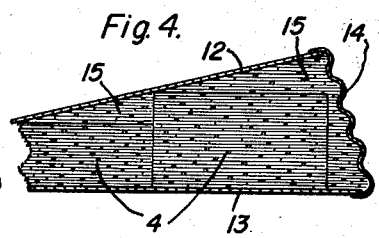
Figure 6:
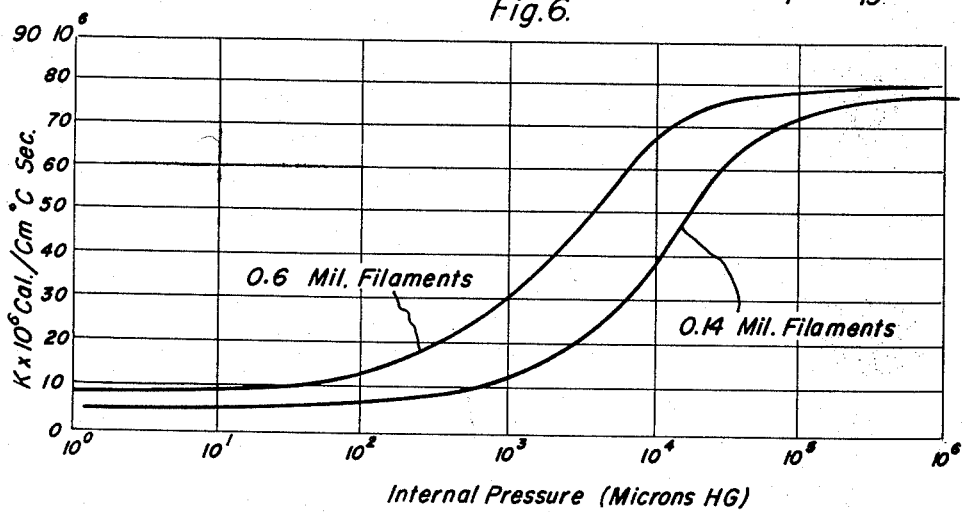
Figure 7:
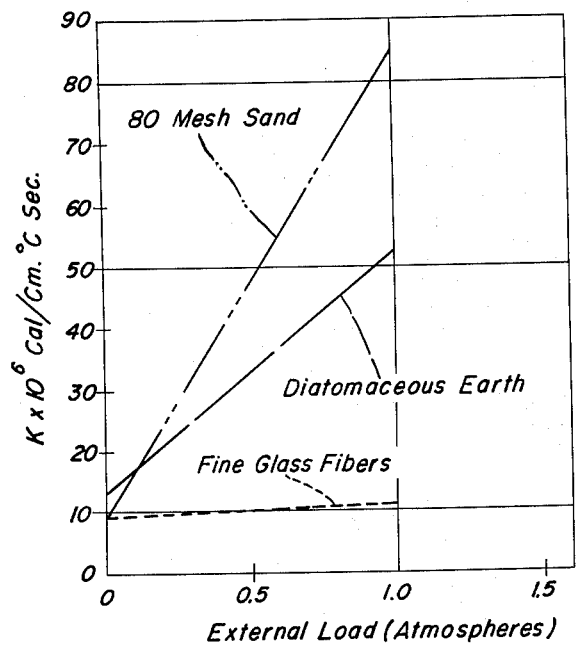
Figure 8:
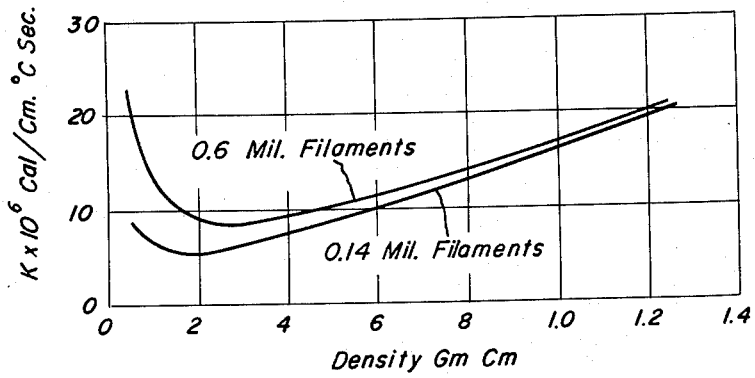
Figure 9:
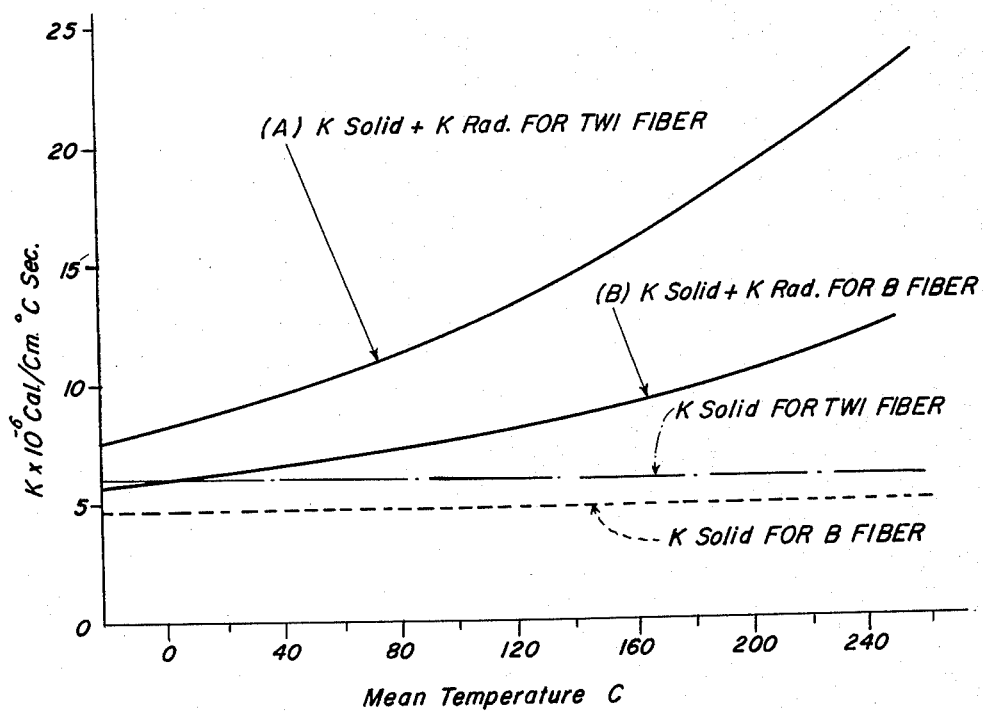

For a better understanding of this invention, reference may be had to the accompanying drawings in which FIG. 1 illustrates a portion of a spaced wall structure employing the insulation of this invention; FIGS. 2, 3 and 4 illustrate portions of modified forms of insulating structure; FIG. 5 illustrates, on a greatly enlarged scale, the general arrangement and relationship of individual fibers or filaments within the evacuated space; FIGS. 6, 7 and 8 are graphs illustrating characteristics of the thermal insulation of this invention under various conditions; and FIG. 9 is a graph illustrating the thermal conductivity of various glass fiber material with respect to temperature. In FIGS. 1, 2, 3, 4 and 5 the preferred orientation of fibers within the filler material is illustrated.

Before proceeding with the description of the insulating structure of this invention, it may be well to consider briefly the manner in which heat transfer may take place through vacuum panels of the type here being considered. Such heat transfer takes place by means of gaseous conduction, radiation and solid conduction. Gaseous conduction is the heat transfer from one molecule of gas to another. As the internal gas pressure within the evacuated space decreases, the heat transfer between gas molecules, in the absence of conduction, remains nearly constant, until the mean free path of the gas molecules approaches the pore size of the filler material. The gaseous conduction then decreases with pressure in an approximately linear relationship until it becomes negligible, the remaining heat transfer being then substantially entirely effected by radiation and by solid conduction through the filler material. The general relationship between the coefficient of thermal conductivity ($k$ factor) and the internal pressure within the evacuated space is illustrated in FIG. 6. This figure will be discussed in greater detail later in the specification in connection with the particular thermal insulation of this invention.

Heat transfer by radiation is greatest when the evacuated space is devoid of any filler material. In the case of Dewar flasks, heat radiation is reduced by providing reflective surfaces on the walls, for example, by silvering or aluminizing. However, where a filler material is employed as a structural element, as in the present invention, the filler material itself, if properly chosen, materially reduces the heat transfer by radiation. Solid conduction involves heat transfer between the spaced walls through the solid material within the space.

In carrying out the objects of this invention, the insulating structure or panel may, for example, be made in the form shown in FIG. 1. This panel may include one wall 1 of a thin, flexible sheet of a material of relatively high thermal conductivity, for example, low carbon steel, and a second wall 2 may be a thin, flexible sheet of a material of relatively low thermal conductivity, for example, stainless steel. The walls 1 and 2 are joined at their edges, as indicated at 3, in any suitable manner, for example, by welding. The space between the sheets 1 and 2 is filled with a body of inorganic rod-like filamentary filler material 4 which provides support for the walls 1 and 2 against the external atmospheric pressure, and is evacuated in the manner well known in the evacuation art. To develop the load-bearing capacity thereof the material 4 may be either precompressed in accordance with the method described and claimed in the copending application of Alfred G. Janos, Serial No. 303,324, filed August 8, 1952, now issued as U.S. Patent No. 2,745,173 and assigned to the assignee of the present invention, or it may be partially compressed before assembly and then placed between the walls 1 and 2 for final compression to the desired load-bearing density under the effect of the external atmospheric pressure. The evacuating process includes a baking period for facilitating removal of gases remaining occluded to the walls and in the filler material. An earlier heat treatment will have to be employed to clean the fibers of any materials, which would gum up or clog the evacuation apparatus. The vacuum bakeout should be conducted at an elevated temperature below the temperature at which the rod-like filamentary material is softened by the heat, in order that the area of contact between crossing filaments in overlying relationship is not thereby increased. In the case of glass fibers used as the filamentary material, for example, a bakeout temperature of 450° C. would be used for borosilicate glass fibers.

In order to support the walls 1 and 2 against the force of external atmospheric pressure and at the same time to minimize heat transfer between the walls through the filler material 4, particularly heat transfer by solid conduction and by radiation, a particular type and arrangement of filler material is employed.

Essentially the approach, which was taken to enable optimum use of the filler material 4 in its two-fold capacities (for load-bearing and for thermal isolation) was to consider each hair-like filament as a structural element, which element properly combined with other filaments would approximate the design of a timber crib structure but on a greatly reduced scale. Such crib structures have, of course, been used for many years, for example as frameworks to support the roofs of mining tunnels or to carry the load of buildings being moved to new sites. In the design of crib structures the sole consideration is, of course, carrying the load involved. However, in the case at hand, thermal considerations had to receive equal emphasis and these considerations presented substantial obstacles for which provisions had to be made.

First, in order to limit the extent of the contact area between crossing filaments in overlying relationship, a cylindrical shape was selected for the filaments and it was proposed that these filaments be able to retain this shape under the design load. If the filament rods should crush or deform under the high contact stresses applied over the very small bearing areas available between contacting cylinders, such change in shape would increase appreciably the areas of contact between filaments and thereby increase the solid conduction diminishing the effectiveness of the thermal isolation. Knowing that the design load for the crib arrangement of filaments must be at least one atmosphere (the load may be greater depending upon the use to which the panel is to be put), the minimum allowable hardness and strength of the filaments for the practice of this invention were determined.

Second, a conventional crib arrangement for the filaments wherein the intersections of crossing filaments (the inter-filament areas of contact) would lie substantially in a series of parallel straight lines extending more or less perpendicular to walls 1 and 2 and therefore parallel to the heat flow would provide ready paths for the flow of heat energy by solid conduction. Therefore, the arrangement of the fibers in alternate parallel planes perpendicular to the flow of heat was shifted to eliminate any such straight line flow of heat through the panel. The most practical manner for effectuating this arrangement is shown in FIG. 5, wherein are shown fibers in four successive layers of such an ideally oriented filler 4. In each of layers 21, 22, 23 and 24 are shown three fibers disposed at random. The topmost layer, layer 21, contains fibers 21a, 21b and 21c; the next lower layer adjacent thereto, layer 22, contains fibers 22a, 22b and 22c, etc. Insofar as possible the random disposition of these fibers in the third dimension (i.e., extending into adjacent layers of fibers) must be minimized. As the consequence of this chosen orientation of fibers, tortuous paths must be taken by heat energy during transmission through the panel by solid conduction. Several such paths are shown by the dotted lines in FIG. 5.

Third, by employing some distribution of sizes of rod-like filaments a substantial amount of "bridging" of fibers occurs as, for example, in FIG. 5 filament 24b is bridged by filament 23a because of the lesser thickness of filament 24b as compared to filaments 24a and 24c. Thus, there will be no contact between filaments 23a and 24b as long as filament 23a has sufficient resistance to bending not to deflect under load. Actually, this provision is collateral to the first requirement described above. Similarly filaments 21b and 22c are intended to be shown bridging over filaments 22b and 23b, respectively.

In addition to the aforementioned critical design parameters with respect to filament orientation still other critical parameters, such as hardness and average fiber size (filament diameter), are involved in the practice of this invention as will be described below.

Among the hard, stable materials obtainable as fine rod-like filaments and having the requisite hardness and strength is glass and, therefore, this invention will be described with respect to the use of glass filaments by way of example to form filler 4.

As described in the general discussion above, elongated fine filaments of glass are shown, which rod-like structures are shown substantially all disposed in a plurality of substantially parallel planes and disposed at random in these planes. Stated another way, the elongated filaments are preferably all arranged in planes extending in the general direction of the walls 1 and 2, so that substantially the full length of each filament extends transverse to the direction of heat flow between the walls and the projected length of each filament extending normal to the general direction of the walls is minimized, but in each parallel plane the filaments are disposed at random with respect to each other.

After the above-described orientation of filaments was designed, constructed and successfully tested it was found that among the large variety of glass and glass fiber materials commercially available a select few could be obtained having the proper size filaments arranged in the approximate orientation described above. Further it was found that upon request a special production method could be employed by the manufacturers of this glass fiber material, which methods are commercially feasible and can be used to lay the fibers down in a manner that restricts each fiber to very thin layers so that a minimum of fiber short circuiting across layers occurs. This method produces much more efficient insulation in vacuo under the atmospheric pressure load bearing conditions than the few useable conventional glass fiber materials and is the preferred structure for this invention. Although but little improvement is provided in the insulating value of this highly oriented glass fiber material when used as air-filled insulation, i.e., the usual use, a decided improvement (by a factor ranging from 2 to 10) is obtained for the practice of this invention. Such materials, when treated as described later herein to remove certain foreign substances may conveniently be employed to prepare filler material in the practice of this invention.

Thus, insulating materials sold under the trade name "Fiberglas" and identified as "TWF fiber" or "B fiber" have satisfactory filament orientation because of the nature of the manufacturing process. This commercially available insulation can be used in constructing the evacuated thermal insulating structure of this invention, if the commercial material is properly compressed, cleaned of lubricant and binder and positioned in the structure so that the planes or layers of filaments extend in the general direction of the walls, that is, generally transverse to the direction of heat flow between the walls. As has been stated above, this description with respect to glass is exemplary and all filamentous materials having similar characteristics with respect to hardness, strength, fiber size, low thermal conductivity and chemcial stability, that is, having no tendency to give off any appreciable amount of gases over a prolonged period may be used. For example, filaments made of materials such as quartz and the like may be employed, provided, of course, that the filaments are arranged as described above.

A modified form of insulating structure or panel is shown in FIG. 2. In the form there illustrated the spaced walls 6 and 7 are both formed of a material of relatively high heat conductivity, for example, low carbon steel. The panel is sealed at the edges of the sheets 6 and 7 by a breaker strip 8 of a material of low heat conductivity, for example, stainless steel. The breaker strip 8 may be corrugated, as shown, to increase the length of the heat path therethrough.

In the forms shown in FIGS. 1 and 2, the spaced walls are parallel to each other. The thermal insulating structure of this invention may, of course, also include structures in which one or both walls are not flat and where these walls are not parallel to each other. For example, in FIG. 3 there is shown a structure which includes a flat wall 9 and a second wall 10 of corrugated cross section spaced from the wall 9. The major portion of the space between walls 9 and 10 is filled with a filler material 4 of the type discussed above. The remainder of the space, namely, that within the corrugations of the wall 10, is filled with a thermal insulating material, as indicated at 11, which may be of the same type as the filler material 4 or other suitable thermal insulating material. As another example, the insulating structure may be as shown in FIG. 4 wherein the spaced walls 12 and 13 are inclined at an acute angle relative to each other. The walls 12 and 13 are sealed at the edges by a breaker strip 14 of a material of low heat conductivity. At least the major portion of the space between the walls is filled with the filler material 4 of the type discussed above. For example, blocks of appropriately oriented filler material 4 having generally parallel opposite faces may be employed, and the remaining spaces of triangular cross section may be filled with thermal insulating material of the same type as the filler material 4 or other suitable thermal insulating material as indicated at 15.

The orientation of the filaments is shown on a highly magnified scale in FIG. 5. In each of the four sets of filaments 21, 22, 23 and 24 the individual filaments are disposed at various substantial angles relative to each other but each set of filaments is substantially in one plane or at most in a succession of several substantially parallel planes. In other words, there is very little three-dimensional random disposition of fibers. Obviously, the ideal arrangement depicted in FIGS. 1-5 cannot be realized economically with present day techniques, and as a practical matter each "plane" as referred to herein may consist of several layers of matted fibers disposed at random and crossed somewhat as filament 21a, for example, crosses over filament 21b. Thus, in forming a lattice structure of this type, portions of individual filaments may extend through several planes, but the projected length of the individual filaments in a direction perpendicular to the planes is very small compared to the projected length extending in the direction of the planes. In disposing the filler material within the evacuated space, in the form shown in FIG. 1, for example, the planes in which the filaments are disposed at random are arranged parallel to the walls or sheets 1 and 2, that is, perpendicular to the direction of heat flow from one wall to the other. A plurality of substantially parallel planes of such elongated filaments disposed at random are employed between the walls 1 and 2.

It can be seen by reference to FIG. 5 that the arrangement of the glass filaments described above provides relatively long paths for solid conduction between the walls 1 and 2. Thus, in FIG. 5, it will be noted that the heat flow by solid conduction between points 26 and 27 and between points 28 and 29 must follow long and tortuous paths indicated by the dotted lines 31, 32 respectively. Hence heat transfer by solid conduction is materially reduced over that which would exist, if there were a more direct path between these same points in the direction of heat flow between the spaced walls 1 and 2. This long and tortuous path for solid conduction is multiplied many times because of the numerous layers of such filaments between the walls so that the solid conduction is very much less than that which exists where solid spacers, for example, are employed. As stated above the modified crib arrangement of rod-like filaments with random disposition of the filaments results in relatively small areas of contact at the point where the transversely related crossing filaments in overlying relationship engage each other. As an indication of the small total area of contact between successive planes, this area is about 1/10,000 of the total area of a plane.

In contrast to the effectiveness of this random disposition of filaments from a solid heat conduction standpoint, should the filaments all be disposed in the same direction, that is, parallel and adjacent to each other, each filament would engage adjacent filaments substantially throughout its length and thereby provide a large area of contact between the adjacent filaments.

Glass is a relatively hard (about 5 on the Mohs scale) and incompressible material, having a Young's modulus in the range, for example, from 7,000,000 to 12,000,000 pounds per square inch. Because the material employed is relatively hard and incompressible, there is relatively little increase in the area of contact between the individual filaments under the compressive force exerted by the external atmosphere against the evacuated insulating structure or panel. Hence, there is relatively little change in the solid conductivity of the filler material of this invention whether the insulation is in its uncompressed or in its highly compressed state. This, of course, is of particular significance in the application to evacuated insulating structure or panels, since a substantial differential pressure and hence a substantial compressing force on the filler material necessarily exists in such structures. By employing a filler material having individual filaments of the characteristics and arrangement described above, any increase in solid conduction resulting from the substantial compressive force exerted on the filler material is minimized. It should be noted further that, in addition to the fact that the use of relatively hard and incompressible materials, such as glass, minimizes the increase in the contact area between adjacent fibers under the differential pressure involved, any slight increase in the area of contact due to this increased pressure has relatively little effect on the total resistance to heat flow, since the major portion of this resistance is along the elongated paths, such as the paths 31, 32 described above, provided by the length of filaments between successive contact points, and this resistance attributable to the length of the filaments between contact points is, of course, not affected by the pressure exerted on the filaments at the contact points.

The relatively slight increase in solid conductivity in the compressed state of the filler material of this invention is in direct contrast to the very substantial increase in solid conductivity in the compressed state of other materials, such as finely divided and powdered materials. The reason for this difference is that in the compressed state, the fine particles of powdered material engage adjacent particles substantially throughout the surface thereof. Hence, when highly compressed, the area of contact is tremendously increased and the solid conductivity, since the heat flow finds a direct path between the walls through the contacting solid particles, is also materially increased. The path for solid conduction through compressed powdered insulation is, therefore, generally in the direction of heat flow, i.e., along the temperature gradient, whereas the path through the randomly disposed filaments of the present invention is substantially all along the filaments in a direction perpendicular to the temperature gradient. Hence, filler materials of randomly disposed elongated filaments, such as those employed in the insulating structure in this invention, are materially superior to finely divided and powdered materials in the specific application to vacuum insulation, wherein a heavy compressive force against the filler material necessarily exists.

A comparison of the change in the $k$ factor, or coefficient of thermal conductivity, with change in external load for powdered or granulated materials and the filler material of this invention is graphically illustrated in FIG. 7. In FIG. 7 "A" illustrates the coefficient of thermal conductivity of 80 mesh sand under different external loads, "B" applies to diatomaceous earth or kieselguhr, and "C" applies to the filler material properly selected, oriented and incorporated in accordance with this invention. It will be noted that there is relatively little difference in the coefficient of thermal conductivity of these three materials where no compressive load is exerted thereon. Under zero compressive load in an evacuated enclosure, 80 mesh sand has a coefficient of thermal conductivity of approximately $9 \times 10^{-6}$ cal./cm. ° C. sec., diatomaceous earth or kieselguhr has a coefficient of thermal conductivity of about $12 \times 10^{-6}$ cal./cm. ° C. sec., and the filler material selected, oriented and incorporated as described herein has a coefficient of thermal conductivity of about $9 \times 10^{-6}$ cal./cm. ° C. sec. However, when a compressive force of one atmosphere, which, of course, necessarily exists in vacuum insulated structures such as those here being considered, is applied, the coefficient of thermal conductivity of sand increases to about $83 \times 10^{-6}$ cal./cm. ° C. sec., a value nine times as great as that under zero compressive force. The coefficient of thermal conductivity of kieselguhr increases from $12 \times 10^{-6}$ cal./cm. ° C. sec. to approximately $52 \times 10^{-6}$ cal./cm. ° C. sec., a value over four times as large as that in the uncompressed state. In contrast to these tremendous increases in thermal conductivity, the coefficient of thermal conductivity of filler material properly selected, oriented and incorporated in the insulating structure of this invention increases only from $9 \times 10^{-6}$ cal./cm. ° C. sec. to $10.5 \times 10^{-6}$ cal./cm. ° C. sec., this increase being only about one-sixth of its value in the uncompressed state.

The reason for such behavior may be appreciated by reference to the definition of thermal conductivity which is given as $$k = \frac{Q \times d}{A \times \Delta T}$$

In this expression Q is the amount of heat in calories per second which crosses an area A through a thickness $d$ under the influence of a temperature difference $\Delta T$. By choosing fiber material of the proper hardness, strength, shape and thermal conductivity and orienting the fibers in accordance with this invention, $d$ becomes smaller as the filler material is compressed without appreciable change in Q. When granular or powdered materials are compressed, $d$ decreases very little and Q increases several fold. Thus, the filler material employed in the insulating structure of the present invention retards heat flow effectively even when its thickness $d$ is substantially reduced and is quite small.

The filler material employed in the insulating structure in accordance with the teachings of this invention also offers a distinct advantage over powdered or granulated type filler materials from the standpoint of ease of evacuation. When compressed, particles of powdered materials tend to pack very tightly against each other, as indicated above, blocking the flow of gases from the interior of such fillter materials, thereby making the evacuation very difficult and necessitating a prolonged evacuation period. On the other hand the lattice or crib-like structure resulting from the orientation of the individual filaments in the filler material employed in the insulating structure of the present invention provides numerous spaces affording paths for flow of gases from the interior of the filler material, thereby rendering the evacuation of the insulating space easier.

The aforementioned discussion is not intended to indicate that the simple choice of glass or glass filaments as the filler material is sufficient to provide the remarkable performance provided by this invention. On the contrary, far more important is the recognition that specific filament hardness, strength, shape, orientation, thermal conductivity and filler density are essential to the securing of the advantages of this invention. Thereafter the filament material chosen could be glass, but the choice would be a particular glass filament material. Various configurations and orientations of glass material are commercially available, which provide little or no advantage over the constructions and filler materials previously known. This may be best illustrated by examination of Table I below:

TABLE I

*Thermal conductivity of various evacuated fibers under compression of atmospheric pressure load*

| Sample | Cal. K, cal./cm.° C. sec. |
|---|---|
| 1. Rock wool | $46.5 \times 10^{-6}$ |
| 2. Asbestos lint | $30 \times 10^{-6}$ |
| 3. Stainless steel wool (fine grade) | $22 \times 33 \times 10^{-6}$ |
| 4. Steel wool 4/0 | $36 \times 10^{-6}$ |
| 5. Cotton felt ("Webril R2801" from Kendall Mills, Walpole, Mass.) | $20 \times 10^{-6}$ |
| 6. Paper from a scratch pad | $37.0 \times 10^{-6}$ |
| 7. Shredded paper | $18.8 \times 10^{-6}$ |
| 8. Glass beads 3/16-inch diam | 98 |
| 9. Glass beads 0.002-inch diam | 50 |
| 10. Crushed Pyrex glass | 23 |
| 11. Glass needles $125\mu$ diam | 39 |
| 12. Glass fibers disposed at random in all directions as used in wall insulations in buildings. | 40 |
| 13. Glass cloth—close weave—$6 \times 10^{-4}$ cm. diam. fibers forming the threads. | 20 |
| 14. Glass fibers ($6 \times 10^{-4}$ cm. diam.) laid parallel to each other and perpendicular to direction of heat flow. | 62 |
| 15. Glass fibers ($6 \times 10^{-4}$ cm. diam.) laid parallel to each other and parallel to heat flow. | 72 |
| 16. Glass fibers laid in random disposition in planes oriented perpendicular to heat flow. | 3.9 to 10 |

Thus, a very important fact established by Table I is that several glass configurations actually yield relatively poor insulating values, when improperly employed or formed in the wrong size or shape.

Table I also serves to establish that from the standpoint of solid conduction, it is important that the filaments be disposed in successive substantially parallel planes or layers and be disposed at random within these planes, these planes extending in the general direction of the walls and transverse to the direction of heat flow between these walls. From Sample 12 of Table I it will be appreciated that random disposition of the filaments in three dimensions, wherein a substantial number of the filaments would lie perpendicular to the walls and hence extend in the direction of heat flow between the walls, would thereby provide a more direct and shorter path between the walls than the long and tortuous path provided along the successive elongated filaments oriented in planes extending in the general direction of the walls.

While it is apparent that in a filler material involving many thousands of filaments interlaced in the manner described, some portions of the length of the filaments may be inclined to the planes or layers and may in some cases extend, for example, through several adjacent layers of matted filaments, the projected length of each filament normal to the aforementioned planes is very small compared to the total length of the filament and substantially the full length of filament extends in the direction of the planes.

By way of example, when glass filaments having a conductivity of $2.8 \times 10^{-3}$ cal./cm. ° C. sec. were disposed in substantially parallel planes and disposed at random in accordance with this invention, a batt having a density of 0.23 gram per cu. cm. showed an overall coefficient of thermal conductivity in an evacuated structure in the range from 25° C. to 140° C. of $8.8 \times 10^{-6}$ cal./cm. ° C. sec. However, as shown in Sample 15 of Table I, when the same filaments were disposed at random with a substantial proportion of the filaments extending parallel to the direction of heat flow, rather than perpendicular to the direction of heat flow, in a batt of the same density, the thermal conductivity increased to about $72 \times 10^{-6}$ cal./cm. ° C. sec. Hence, not only is the filler material employed in the insulating structure in accordance with the teachings of this invention superior to finely divided or powdered materials, but it is also superior to those filamentous materials arranged in a manner differing from that taught in this application.

Moreover, since the hardness of the glass (minimum of about 5 on the Mohs scale) or similar materials employed is significant in resisting increase in the contact area between adjacent filaments under compressive external force, as pointed out above, it will be apparent that the filler material employed in the insulating structure of this invention possesses advantages over filamentous insulation composed of more compressible materials. Thus, cotton which has a "$k$" value about $1/10$ that of glass exhibits thermal conduction in vacuo of 2 to 5 times the thermal conduction of the filler material prepared according to this invention, because of squashing down of the fibers at the contact points under the load of the atmosphere. It is noted further that, when commercially-prepared glass fiber insulation is employed in the conventional manner, as air-filled insulation at atmospheric pressure such as, for example, in present day refrigerators, whether the fibers are or are not arranged in random disposition in substantially parallel oriented planes has relatively little effect on the thermal conductivity. As an indication, the increase in thermal conductivity when the fibers are disposed in three dimensions as opposed to random disposition only in substantially parallel oriented planes may be about 5 percent in air-filled insulation. By contrast, in structures employing an evacuated space, the difference resulting by the arrangement of the filaments in random disposition in parallel oriented planes, as indicated in Table I above, may be in the order of 800 percent.

It is interesting to compare the thermal conductivities of the several materials now employed in insulating structures where these materials are used, on the one hand, under ordinary atmospheric or air-filled conditions and, on the other hand, in evacuated structures. It might normally be expected that employing known insulating materials in evacuated structures would improve the properties in approximately the same proportion for all materials because of the effect of evacuation in decreasing the gaseous conduction. However, it has been found that the reduction in thermal conductivity does not occur in substantially the same proportion for various materials and it has further been found that the decrease in thermal conductivity in the case of the filler material employed in the insulating structure of this invention is much greater than that of other presently employed insulating materials. A comparison of several materials is given in Table II below. The values in the table are given in terms of $k$(thermal conductivity) $\times 10^{-6}$ cal./cm. ° C. sec.

*Table II*

| | Air-filled | Vacuum |
|---|---|---|
| Glass filaments oriented in parallel planes and disposed at random in these planes | 90 | 6–10 |
| Bulk rock wool | 82 | 20–50 |
| Silica aerogel | 55 | 32 |
| Sil-O-Cel | 100–130 | 50 |
| Vermiculite | 110 | 110 |

From the above table it can readily be seen that the decrease in thermal conductivity for such materials as rock wool, silica aerogel, etc., resulting from employing these materials in evacuated enclosures, is relatively small. By contrast, the filler material comprising a plurality of glass filaments arranged in substantially parallel planes and disposed at random in these planes, as employed in the insulating structures of this invention, shows a materially greater decrease in thermal conductivity to only one-tenth of its value in the air-filled condition.

Another factor affecting the effectiveness of the filler material employed in accordance with the teachings of this invention is the density of the material employed. As illustrated in FIG. 8, the coefficient of thermal conductivity decreases with decrease in density to a minimum point, and thereafter further decrease in density results in an increase in the coefficient of thermal conductivity. Thus, referring to the graph in FIG. 8, it can be seen that with a filler material employing filaments of a material such as glass having an average diameter of 0.6 mil in an evacuated structure, a minimum conductivity of slightly less than $9 \times 10^{-6}$ cal./cm. ° C. sec. occurs when the material has a density of approximately 0.25 gram per cu. cm. When this density is increased to approximately 1.2 grams per cu. cm., the coefficient of thermal conductivity increases to $20 \times 10^{-6}$ cal./cm. ° C. sec., and similarly this coefficient of thermal conductivity increases to approximately $25 \times 10^{-6}$ cal./cm. ° C. sec. when the density decreased to 0.05 gram per cu. cm. While, of course, a reasonable range of densities can be employed depending on how much variation in thermal conductivity is to be tolerated from the minimum available, the graph in FIG. 8 graphically indicates a relationship by which the optimum point for two different filler materials of the type disclosed in this invention employing glass filaments of an average diameter of 0.14 mil and 0.6 mil respectively can be determined. Similar curves can be plotted for filler materials of this type employing filaments of different average diameters than those illustrated in FIG. 8. It will be noted that the point of minimum thermal conductivity with respect to density of the material varies with the diameter of the filaments employed. Thus, where the filler material is composed of glass filaments having an average diameter of 0.14 mil, a minimum coefficient of thermal conductivity of $.6 \times 10^{-6}$ cal./cm. ° C. sec. is secured where the density of the material is in the order of 0.175 gram per cu. cm. Thus, the larger the diameter of the filaments employed, the higher the density at which the minimum coefficient of thermal conductivity occurs. As a practical matter, a density of 0.15 gram per cu. cm. to 0.2 gram per cu. cm. is necessary to support the atmospheric load, so this figure provides a practical lower limit in density of material employed. However, the preferred lower limit should be about 0.25 gram/cm.³ as lower densities are too critical and since 0.25 gram/cm.³ is generally approached after panel evacuation. The upper limit of density depends entirely on the amount of deviation which is to be tolerated from the minimum available but should not exceed about 1.2 grams/cm.³. At any rate, FIG. 8 establishes a relationship between the coefficient of thermal conductivity and the density of the filler material of the type employed so that for any batt of a given average diameter of filaments, the minimum coefficient of thermal conductivity and the optimum density can be determined.

As has been discussed earlier in this specification, vacuum insulated structures, such as Dewar flasks, have been previously employed in which no filler material was used, the structures being generally circular so that the walls had sufficient strength to resist the external pressure without deformation. Aside from the limitations with regard to structural shape of such containers, these vacuum structures have another substantial limitation from the standpoint of practical application in structures such as household refrigerators and the like. To retain the insulating effectiveness, the pressure must be maintained at least as low as one micron of mercury. In the mass production of relatively bulky items, such as household refrigerators and the like, in which vacuum insulating construction might be useful for increasing the storage space available, the securing and maintenance of this very low pressure may be difficult because of the necessity of very satisfactory initial evacuation and because of the possibility that gases may later develop within the insulated space from the metals, for example, employed for the walls.

The filler material selected, oriented and incorporated in the insulating structure of this invention as described herein overcomes this difficulty. From FIG. 6, it can be seen that, when filler material of the type described having an average filament diameter of 0.14 mil is employed, there is only a very slight increase in the coefficient of thermal conductivity until the internal pressure is above 100 microns of mercury. Where filaments having an average diameter of 0.6 mil are employed the coefficient of thermal conductivity of the filler material increases only very slightly until the pressure is well over 100 microns of mercury. Hence, with vacuum insulating construction in accordance with this invention, relatively moderate internal pressures of the order of 100 microns of mercury rather than extremely low pressures of the order of 1 micron of mercury may be permitted without any pronounced effect on the insulating value. As noted above, this is a particularly important factor when the insulation is to be manufactured and utilized under mass production conditions and where the walls, unlike the glass walls of Dewar flasks, are made of metal which may give off some quantities of gas over a period of time and thereby increase the pressure within the insulated space.

It can be seen by reference to FIG. 8 that in the thermal insulating structures of this invention the coefficient of thermal conductivity for a given density increases with the diameter of the filaments. The effectiveness of the material from an insulating standpoint increases as the filament diameter decreases to the smallest size now available. By way of specific example, insulating structures of this invention having low thermal conductivity may be made using filler materials of glass filaments having diameters of 0.6 mil or less. Where filaments of diameters varying over a substantial range are employed in the same batt of insulation, this variation in diameters, as mentioned above, results in the bridging of some of the filaments so that no contact for solid conduction is made at these points. In order to minimize the increase in contact area by fiber distortion resulting from the force exerted against the filler material by external atmospheric pressure, the filaments are made of materials having a hardness of at least about 5 on the Mohs hardness scale, such as glass. By way of example, filaments of glass having a Young's modulus of 7,000,000 pounds per quare inch or more are satisfactory. Of course, the solid conductivity of the filler material varies with the conductivity of the material of which the filaments are made. As a further example, the thermal conductivity of the solid material of the filaments used should preferably be less than about 0.0035 cal./cm. ° C. sec. The tensile strength of the filaments must be sufficiently high to minimize breakage of filaments under the atmospheric load. Substantial breakage of filaments would cause the filler material to approach the undesirable condition of the powdered or granular materials discussed above. By way of specific example, the tensile strength should be at least about 150,000 pounds per square inch.

The length of the filaments may vary over a wide range but the minimum length should still be sufficient to bridge several adjacent filaments in order to resist displacement of filaments to retain the desired orientation during any handling before compression. As a rule fiber length should be at least 50 times the fiber diameter.

As mentioned above, some commercially available insulating materials may be employed as the filler material if they are properly compressed, cleaned of lubricant and binder and positioned between the walls in the manner of this invention. It is noted that all commercially available insulating materials include varying amounts of binder and/or lubricant. The great effect of the presence or absence of even a light coating of lubricant or binder upon the coefficient of thermal conductivity of filamentous filler material otherwise properly prepared in accordance with the teachings of this invention has been established by test. If a lubricant is present on the fibers, such as is the case with conventional insulating materials for present day refrigerators, this coefficient of thermal conductivity has been found to be about $17.8 \times 10^{-6}$ cal./cm. °C. sec. The same material under identical test conditions but with the filaments cleaned of lubricant has a coefficient of thermal conductivity of $10.6 \times 10^{-6}$ cal./cm. °C. sec. Similarly, a filler material containing the usual binder and having a thermal conductivity of approximately $20 \times 10^{-6}$ cal./cm. °C. sec., when tested as recited above, was found to have a thermal conductivity of approximately $10 \times 10^{-6}$ cal./cm. °C. sec. in this same use when the binder has been removed. Moreover, lubricants and binders have a tendency to give off gases, raising the pressure within the insulating structure materially and reducing the effectiveness of the construction, since its effectiveness is dependent on the maintenance of relatively low pressure.

Thus, by the unique approach of viewing the capacities of the filler material to sustain load upon its outer face(s) and to resist the transmission of heat energy through the structure, not as a bulk phenomenon, but as dependent primarily upon the load bearing capacity and orientation of the individual structural elements comprising the filler, the design of highly effective thermal insulating structures of the vacuum type has been made much more exacting and predictable. The transmission of heat energy is minimized by achieving a balance between the several mechanisms by which the heat transfer would occur. Thus, gaseous conduction is minimized by evacuating the space so the mean free path of the gas molecules, which increases with reduction in pressure, is large compared to the pore size of the filler material employed. Solid conductivity of the supporting filler material is kept to a minimum by employing the filler in the form of fine elongated filaments lying in a plurality of substantially parallel planes and disposed at random in these planes, which extend in the general direction of the walls and, therefore, transverse to the direction of heat flow between the walls. Long and tortuous paths to minimize solid conductivity between the walls are thus provided. Transfer of heat by radiation is also minimized by the particular filler material employed, because each of the plurality of substantially parallel planes of filaments comprises a barrier tending to reduce heat transfer by radiation. Since the heat transfer by radiation varies as the difference of the fourth powers of the temperatures of the warm and cold sides, this mode of heat transfer is substantially reduced by the presence of a plurality of parallel oriented planes or layers of filaments disposed at random, which in effect divide the space between the walls into many small steps such that the overall temperature difference across any one step is small compared to the total temperature difference.

The discovery of this invention is unique in that the insulating panel member so produced provides a heretofore unapproachably low thermal conductivity combined with a thickness which is fractional compared to previously existing panels. No known insulating panels in planar form have ever been made available in which the filler material supports the atmospheric load, wherein the conductivity $k$ (expressed as microcalories per centimeter per degrees centigrade per second) is less than approximately 15, and wherein this value may be maintained over an appreciable period of time. Duck feathers or eider down during a continuous test produced low $k$ values, but such material is impractical not only for economic reasons, but also because of the fact that in an evacuated panel this material like many other related materials, deteriorates and gives off or forms gases which reduce the degree of evacuation.

The thickness of a panel of this invention may be described as extending from a theoretical minimum to a variable maximum, the maximum being, in one instance, an arbitrary one beyond which the economics and small gain in insulation are unfavorable, and in another instance, an arbitrary thickness employed for a gain in rigidity for structural purposes rather than for increased insulation properties. Thus, in the construction of shipping or rail facilities for transporting low temperature materials, as for example, liquified gases, the useful life of the transporting structure may be sufficiently great to warrant optimum design of the vacuum thermal insulating panels to reduce to an absolute minimum the costs of maintaining the low temperature required. The most practical approach for such construction with present techniques and materials would be to assemble multiple layers of very large panels, which may easily be constructed 10 feet x 4 feet in size, or even larger, and one inch or less in thickness. It is conceivable that these large panels can be made in a single thickness comparable to the total thickness of the multiple layers. However, in no instance should it be necessary to exceed a maximum panel thickness of one-twentieth ($\frac{1}{20}$) the smallest dimension of the panel viewed in plan, whether the panel be of triangular, rectangular, square, hexagonal or other convenient shape. The term "dimension" refers to the distance between adjacent corners measured along the edge of some portion of the evacuated container actually enclosing filler material. In the case of a rectangular panel the smaller of the two dimensions of the panel viewed in plan is intended for determining maximum panel thickness as described above and in those instances in which all sides of the panel viewed in plan are equal, i.e., a square panel, the length of any side will serve as the basis upon which to determine the maximum panel thickness.

The theoretical minimum distance between the walls of the panel may be described as that thickness of filler having sufficient parallel oriented planes containing filaments disposed at random to reduce heat transfer by radiation to an acceptable value. Panels have been assembled in accordance with the teachings of this invention having an overall thickness as little as about $\frac{1}{16}$ of an inch employing metal walls of approximately $\frac{1}{32}$ of an inch and 0.010 of an inch respectively for the outer and inner walls. The preferred range of thickness of panels of this invention is about $\frac{1}{8}$ inch to 1 inch. This thickness provides insulation which is equal to or better than 3 or 4 inches of insulation as presently employed in such domestic appliances as refrigerators and ranges, etc. This remarkably small panel thickness is only possible due to the corresponding low $k$ value inuring to the specific construction of this invention. It is understood that the design $k$ value is the determinate factor in choosing an overall wall or panel thickness so that for a given permissible heat loss the panel of low $k$ value may be made proportionately thinner or for a given thickness, the lower $k$ value will provide substantially superior insulating characteristics.

Thus, in order to obtain the desired insulating properties, the choice and employment of material is extremely important. It is apparent from FIG. 7 and Table II that most materials as fillers will not provide a $k$ value of less than 15 whether the panels within which these fillers are employed are evacuated or are gas filled. From FIG. 7 it is also understood that a low $k$ value is associated with essentially no application of external load. Such a panel not only lacks rigidity but requires extra structure or internal braces which contribute to rapid heat transfer through the panel. FIG. 7 is also indicative of the fact that the desired rigidity may be obtained by evacuation to an atmospheric load without substantial increase in the $k$ value.

In addition to rendering the filaments substantially clean so as to give off no gases during evacuation, the individual strands should not exceed a diameter of 0.0006 inch since larger diameters provide a large contact area between strands for increased heat conductivity. For this reason, as well, not all commercially available fibrous material having the requisite filament shape, hardness, strength and orientation are suitable for the practice of this invention. Considering commercial glass fiber insulation, for example, as manufactured by Owens-Corning Fiberglas Corporation [Fiberglas Standards, Section D1.2.1, pages 2 and 3, June 1, 1944], four of the seven basic fiber sizes are considerably greater than 0.0006 inch. Thus, packs of glass fibers consisting of fiber numbers 85, 450, 600 and 800 will not provide the benefits of this invention regardless of the orientation or cleanliness of the fibers, the density of the filler or the degree of vacuum in the assembled panel.

Furthermore, when compressed large diameter strands of glass become quite brittle and severe breakage occurs under evacuation. Tolerances in the diameters of glass fiber material may be maintained quite closely for commercial grade products, for example, in the manufacture of thread or cloth from glass fibers, and the individual fiber diameters are quite uniform. In the preferred form of this invention moreover, the diameter of the individual fiberglass strands should be quite variable and extend over a wide range. The variation in diameter results in the bridging of some of the filaments so that no contact or solid conduction is made in the bridging over, i.e., that there are fewer points or areas of contact in varying diameter fibers than there are in fibers all of the same diameter. The preferred range extends from very fine fibers of less than 0.00001 inch to approximately 0.0006 inch in diameter.

The density of the glass fiber material is an important factor in obtaining the low $k$ value. Density in this instance is generally understood as the ultimate density of the material after being subjected to the atmospheric load by evacuation. A low density filler is ineffective since it will not support the atmospheric load and will cause severe buckling of the panel while, on the other hand, an overly high density will increase the $k$ value, because the contact areas are made larger, and also increase the weight of the unit. A high density in combination with large diameter fibers will result in a filler material with large contact areas, substantial breakage of the individual fibers, and a consequent increase in the $k$ factor. The filler material employed is generally in an original (uncompressed) thickness of several inches and is precompressed under increased temperature conditions to an inch or less of thickness. Preferably, the vaporizable impurities on the filaments are driven off at this time. The filler material remains in the compressed stage after treatment, after which it is compressed to the final desired density in the panel by the evacuation step. Alternately, of course, the filler material may be compressed during the assembly operation of the panel. However, removal of vaporizable impurities from the filler should be effected before placing the filler material in the panel, because if such impurities are present during vacuum bakeout the vacuum system pipe connections may become clogged and partially decomposed harmful tar-like residues are left within the panel itself.

While the curve of FIG. 8 illustrates the variation of the $k$ value with respect to density for two different diameter fiber materials, the curves thus shown have been extended by mathematical calculations and actual practice has shown that the preferred range of densities is from approximately .25 gram per cubic centimeter for load support purposes to about .5 gram per cubic centimeter. Care must be taken in the choice of filler materials in order that the ultimate density after the panel has been evacuated lies in this range.

FIG. 9 shows a pair of curves (A and B) for glass fiber fillers of $13 \times 10^{-4}$ centimeter average diameter, curve A, and $3.6 \times 10^{-4}$ centimeter average diameter, curve B, that represent $k$ value as a function of temperature. It can be seen from this figure that a $k$ value of approximately 10 for curve B corresponds to a mean temperature condition of approximately 200° C. It is not practical to employ panels of this invention in flat form of dimensions less than about a foot square because edge conduction will become too large a factor. However, a panel of lower $k$ value will permit a decrease in this size limitation. For the $k$ value to be true over the major portion of the panel some care must be given to the edge construction as illustrated in FIGS. 1 and 2. In FIG. 1 the outer wall 1 is low carbon steel and inner wall 2 is stainless steel. Alternatively as in FIG. 2 a strip 8 of low conductivity may be employed between similar walls.

The low $k$ value of 15 or less has heretofore been obtainable only in vessels such as a Dewar flask wherein the insulating material may be employed without compression since the curved walls support the atmospheric load. The panels of this invention accordingly, and more particularly, relate to panels wherein the filler material is compressed and where the curvature of the walls are not sufficient to support the atmospheric load. While the preferred embodiment of this invention employs metal walls, various other materials may be used for the walls, but in all instances the wall material must be impermeable to gas diffusion from the surrounding gaseous environment and be clean and free from slag inclusions or other impurities which may either generate or give off gases during the evacuation process.

It may, therefore, in summation be stated that in order to provide an insulating panel of an inch or less thick (in panels larger than 20″ square the maximum thickness is $\frac{1}{20}$ the smallest dimension of the panel) operable in the temperature range of a mean average of about 200° C. and having a characteristic low $k$ value of less than about 15, the following are established as useful criteria.

The panel walls may be of various materials, but in the preferred form of this invention, are metal, and in all cases must be substantially free of impurities which may tend to generate or give off gases under evacuated conditions.

If the filler material is of glass fibers, the ultimate density should be in the range of .25 gram to .5 gram per cubic centimeter. Whatever material is chosen, the diameters of the individual fibers must be in the range from a low value of less than 0.00001 inch to approximately 0.0006 inch; tensile strength of approximately 150,000 p.s.i., and an individual $k$ value of less than about $3.5 \times 10^{-3}$ cal./cm. ° C. sec. The filler material in all instances should be substantially clean from all impurities and lubricants, etc., which may tend to give off gases under evacuation conditions or contribute the thermal conductivity of the fiber material. The evacuation need be carried on only to about 100 microns of mercury as the internal pressure.

By way of comparison a ½ inch thick panel assembled in accordance with the teachings of this invention, under similar circumstances superior to a panel of silica aerogel 2½ inches thick, a panel of conventional fiber-type insulation, wood, hair, somewhat oriented glass fibers, alumina or kapok of 4 inch thickness, or a panel of mineral or rock wool, cane fiber board, cork, gypsum, etc. of 5 to 6 inches thick.

While specific embodiments of this invention have been shown and described, it is not desired that the invention be limited to the particular constructions shown and described and it is intended by the appended claims to cover all modifications within the spirit and scope of this invention.

What we claim as new and desired to secure by Letters Patent of the United States is:

1. A thermal insulating structure of the vacuum type having a thermal conductivity of less than about 15 microcal./cm. ° C. sec. consisting essentially of:
   (a) a hermetically closed container having the form of a panel with a thickness less than about one-twentieth of the short dimension of said container viewed in plan and having an internal pressure of less than about 100 microns of mercury,
      (1) said container being impermeable to diffusion by fluid ambient thereto,
   (b) a thin flexible first wall and a second wall in spaced relation therewith,
      (1) said walls extending transverse to the direction of heat flow and forming two walls of said container, and
   (c) a filamentous filler disposed between said first and second walls,
      (1) said filler having the capacity to support said walls in fixed spaced relationship under a uniformly applied load of at least about two thousand pounds per square foot and the filaments thereof being characterized by:
         (a) being substantially circular in cross-section with a diameter smaller than about 0.0006 inch,
         (b) having strength of at least about 150,000 pounds per square inch,
         (c) having a hardness of at least about 5 on the Mohs scale,
         (d) having a maximum thermal conductivity of about 0.0035 cal./cm. ° C. sec.,
         (e) being free of matter foreign to the filaments which will increase the thermal conductivity between filaments, and
         (f) being disposed at random in a plurality of substantially parallel oriented planes substantially perpendicular to the direction of heat flow.

2. A thermal insulating structure of the vacuum type having a thermal conductivity of less than about 15 microcal./cm. ° C. sec. consisting essentially of:
   (a) a hermetically closed container having the form of a panel with a thickness less than about one-twentieth of the shortest dimension thereof and having an internal pressure of less than about 100 microns of mercury,
      (1) said container being impermeable to diffusion by fluid ambient thereto,
   (b) a thin flexible first wall and a second wall in spaced relation therewith,
      (1) said walls extending transverse to the direction of the heat flow and forming two walls of said container, and
   (c) a filler of glass fiber filaments disposed between said first and second walls,
      (1) said filler having a final density in the range of 0.15 to 1.12 gms./cm.$^3$ with the capacity to support said walls in fixed spaced relationship under a uniformly applied load of at least about two thousand pounds per square foot and the filaments thereof being characterized by:
         (a) being substantially circular in cross-section with a diameter smaller than about 0.0006 inch,
         (b) having strength of at least about 150,000 pounds per square inch,
         (c) having hardness of at least about 5 on the Mohs scale,
         (d) having a maximum thermal conductivity of about 0.0035 cal./cm. ° C. sec.,
         (e) being free of foreign matter which will increase the thermal conductivity between filaments, and
         (f) being disposed at random in a plurality of substantially parallel oriented planes substantially perpendicular to the direction of heat flow.

3. A thermal insulating structure of the vacuum type having a thermal conductivity of less than about 15 microcal./cm. ° C. sec. consisting essentially of:
   (a) a hermetically closed container having the form of a panel with a maximum thickness of about 1 inch and having an internal pressure of less than about 100 microns of mercury,
      (1) said container being impermeable to diffusion by fluid ambient thereto,
   (b) a thin flexible first wall and a second wall in spaced relation therewith,
      (1) said walls extending transverse to the direction of the heat flowing and forming two walls of said container, and
   (c) a filler of glass fiber filaments disposed between said first and second walls,
      (1) said filler having a final density in the range of 0.15 to 1.12 gms./cm.$^3$ with the capacity to support said walls in fixed spaced relationship under a uniformly applied load of at least about two thousand pounds per square foot and the filaments thereof being characterized by:
         (a) being substantially circular in cross-section with a diameter smaller than about 0.0006 inch,
         (b) having strength of at least about 150,000 pounds per square inch,
         (c) having hardness of at least about 5 on the Mohs scale,
         (d) having a maximum thermal conductivity of about 0.0035 cal./cm. ° C. sec.,
         (e) being free of foreign matter which will increase the thermal conductivity between filaments, and
         (f) being disposed at random in a plurality of substantially parallel oriented planes substantially perpendicular to the direction of heat flow.

4. A thermal insulating structure of the vacuum type having a thermal conductivity of less than about 15 microcal./cm. ° C. sec. consisting essentially of:
   (a) a hermetically closed container having the form of a panel with a maximum thickness of about 1 inch and having an internal pressure of less than about 100 microns of mercury,
      (1) said container being impermeable to diffusion by fluid ambient thereto,
   (b) a thin flexible first wall of low carbon steel and a second thin flexible wall of stainless steel in spaced relation therewith,
      (1) said walls extending transverse to the direction of heat flow and forming two walls of said container, and
   (c) a filler of glass fiber filaments disposed between said first and second walls,
      (1) said filler having a final density in the range of about 0.2 to about 0.3 gm./cm.$^3$ with the capacity to support said walls in fixed spaced relationship under a pressure of at least one atmosphere and the filaments thereof being characterized by:
         (a) being substantially circular in cross-section with a diameter smaller than about 0.0006 inch and a fiber length at least 50 times the diameter,
         (b) having strength of at least about 150,000 pounds per square inch,
         (c) having a maximum thermal conductivity of about 0.0035 cal./cm. ° C. sec., (d) being free of foreign matter which increases the thermal conductivity between filaments, and (e) being disposed at random in a plurality of substantially parallel oriented planes substantially perpendicular to the direction of heat flow.

5. A method for preparing a thermal insulating structure of the vacuum type having a thermal conductivity of less than about 15 microcal./cm. ° C. sec., said method consisting essentially of:

(a) providing a glass fiber filler with the filaments thereof characterized by:
  (1) being substantially circular in cross-section with a diameter smaller than 0.0006 inch and a length at least 50 times the diameter,
  (2) having strength of at least about 150,000 pounds per square inch,
  (3) having a maximum thermal conductivity of about 0.0035 cal./cm. ° C. sec.,
  (4) being free of foreign matter which will increase the thermal conductivity between filaments, and
  (5) being disposed at random in a plurality of substantially parallel oriented planes, (b) placing the glass fiber filler in contact with a first metal wall so that the parallel planes in which the filaments are disposed at random are oriented substantially parallel to said first wall to insure disposition of the parallel planes substantially perpendicular to the direction of heat flow through said first wall,
  (1) said first wall being adapted to cooperate with at least one other wall to enclose said filler in a panel configuration comprising a second metal wall opposed to and spaced from said first wall, (c) enclosing said panel configuration around said filler, (d) evacuating the space within said panel configuration to permit the load of the atmospheric pressure to be transmitted to said filler with said filler being compacted to a final density between 0.15 and 1.12 gms./cm.$^3$ with the internal pressure of said panel configuration being less than about 100 microns of mercury, (e) simultaneously heating said panel configuration and said filler to provide bake-out thereof during the evacuation step, and (f) hermetically sealing said panel configuration to maintain the internal pressure of less than about 100 microns of mercury.

References Cited by the Examiner
UNITED STATES PATENTS

| | | | |
|---|---|---|---|
| 903,878 | 11/08 | Mock | 161—407 XR |
| 2,067,051 | 1/37 | Munters | 161—407 XR |
| 2,160,001 | 5/39 | Saborsky. | |
| 2,164,143 | 6/39 | Munters | 161—407 XR |
| 2,206,059 | 7/40 | Slayter | 161—93 XR |

OTHER REFERENCES

Fiberglas Standards Prepared by Owens-Corning Fiberglas Corp., June 1, 1944, Section D1.2.1, pp. 2, 3. Sec. D4.2.1, pp. 1–4 relied on.

EARL M. BERGERT, *Primary Examiner.*

JACOB STEINBERG, *Examiner.*